(12) United States Patent
Soejima

(10) Patent No.: US 9,342,382 B2
(45) Date of Patent: May 17, 2016

(54) PROGRAM PROCESSING METHOD, PROGRAM PROCESSING APPARATUS, AND COMPUTER PROGRAM

(75) Inventor: Kenji Soejima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/579,126

(22) PCT Filed: Feb. 2, 2011

(86) PCT No.: PCT/JP2011/000578
§ 371 (c)(1),
(2), (4) Date: Aug. 15, 2012

(87) PCT Pub. No.: WO2011/121873
PCT Pub. Date: Oct. 6, 2011

(65) Prior Publication Data
US 2013/0111498 A1    May 2, 2013

(30) Foreign Application Priority Data

Mar. 30, 2010  (JP) ................................ 2010-079226

(51) Int. Cl.
*G06F 9/54* (2006.01)
*G06F 9/44* (2006.01)
(52) U.S. Cl.
CPC . *G06F 9/54* (2013.01); *G06F 8/316* (2013.01)
(58) Field of Classification Search
CPC ................................... G06F 9/54; G06F 8/316
See application file for complete search history.

(56) References Cited

U.S. PATENT DOCUMENTS

| 2001/0007976 A1* | 7/2001 | Thompson et al. ............... 705/7 |
| 2005/0165989 A1* | 7/2005 | Kim .............................. 710/260 |
| 2007/0050756 A1* | 3/2007 | Paller ............................ 717/117 |
| 2007/0150855 A1  | 6/2007 | Jeong |
| 2008/0109828 A1* | 5/2008 | Cho et al. ...................... 719/320 |

(Continued)

FOREIGN PATENT DOCUMENTS

| CN | 1302014 A     | 7/2001 |
| JP | 2000-207213 A | 7/2000 |

(Continued)

OTHER PUBLICATIONS

Kaan Yamanyar, Difference between static AOP and dyanmic AOP, Apr. 16, 2009. p. 1-3.*

(Continued)

*Primary Examiner* — Syed Roni
(74) *Attorney, Agent, or Firm* — Sughrue Mion, PLLC

(57) ABSTRACT

Internal processes of specified components are connected to each other when an application is executed regardless of interface definition between the components and a new process is executed. A program processing apparatus (100) includes an aspect application unit (102) which generates a routing unit (201) and a connector unit (301) and applies the routing unit (201) and the connector unit (301), respectively to a component (200) and a component (300) which are included in an activated program, and a configuration management unit (101) which causes the routing unit (201) applied to the component (200) and the connector unit (301) applied to the component (300) to establish a communication connection with each other and causes the component (300) to send a process result of an process instruction in the component (300) to the component (200) through the established communication connection.

8 Claims, 8 Drawing Sheets

(56) References Cited

U.S. PATENT DOCUMENTS

| | | | |
|---|---|---|---|
| 2008/0168422 A1* | 7/2008 | Cheng et al. | 717/114 |
| 2009/0007084 A1* | 1/2009 | Conallen et al. | 717/146 |
| 2009/0119653 A1* | 5/2009 | Kettley et al. | 717/151 |
| 2009/0199213 A1* | 8/2009 | Webster et al. | 719/320 |
| 2009/0313623 A1* | 12/2009 | Coskun et al. | G06F 9/505 718/100 |

FOREIGN PATENT DOCUMENTS

| | | |
|---|---|---|
| JP | 2003-256391 A | 9/2003 |
| JP | 2006-526209 A | 11/2006 |
| JP | 2007-213487 A | 8/2007 |
| JP | 2009-042951 A | 2/2009 |

OTHER PUBLICATIONS

Communication date Dec. 16, 2014, issued by the Japan Patent Office in corresponding Japanese Application No. 2012-508038.

Nomura et al., Archface: An Interface Mechanism for Encapsulating Architecture description, Lecture Note in Software 35, Foundation of software engineering XVI, Japan, Kindaikagakusha Co., Ltd., Nov. 30, 2009, pp. 107 to 118.

Communication dated Oct. 29, 2014, issued by the State Intellectual Property Office of P.R. China in counterpart Chinese application No. 201180017734.5.

* cited by examiner

PROGRAM PROCESSING METHOD, PROGRAM PROCESSING APPARATUS, AND COMPUTER PROGRAM

CROSS REFERENCE TO RELATED APPLICATIONS

This application is a National Stage of International Application No. PCT/JP2011/000578 filed on Feb. 2, 2011, which claims priority from Japanese Patent Application No. 2010-079226, filed on Mar. 30, 2010, the contents of all of which are incorporated herein by reference in their entirety.

TECHNICAL FIELD

The present invention relates to a program processing method, a program processing apparatus, and a computer program. In particular, the present invention relates to a program processing method, a program processing apparatus, and a computer program for changing a program including a plurality of parts to an optimal configuration according to a state of a system on which the program runs when the program is executed.

BACKGROUND ART

In a general configuration method of an application, a specific task is divided into relatively small functional units, each of which is processable, in a design stage of the application, and a program is created for each small functional unit. Finally, the programs are linked to each other by compilation and link operation of the programs and integrated into one application program.

In the above method, the configuration of the application is determined when the application is compiled and linked. In other words, this method is an approach in which the configuration is fixed before the application is put into a system on the premise that the environment and the state of the system on which the application is executed are fixed. This method is effective if external functions required by the application are limited to functions included in the operating system (Windows (registered trademark), MacOS, Linux, or the like) and there are no performance requirements such that an operation included in an action of the application is completed within a certain time period.

In recent years, an approach for performing a part of the link operation at the start up of the application is invented. This is an approach in which the configuration of the application is described as a definition file and the functional units are linked to each other on the basis of the description content of the definition file when the application is executed. Therefore, at the time point when the application is deployed in an execution environment, the configuration of the application is not fixed and individual functional units are present independently.

In the above method, the configuration of the application can be changed by using a setting file according to the environment in which the application is executed, so that it is possible to change the configuration relatively easier than the method in which the configuration is fixed by linking the functional units in advance.

PATENT DOCUMENT 1 (Japanese National Publication of International Patent Application, No. 2006-526209) proposes a method for defining the setting file, in which the configuration of the application is defined, as metadata, and using Glue code to adjust consistency of interfaces between functional parts.

RELATED DOCUMENT

Patent Document

PATENT DOCUMENT 1: Japanese National Publication of International Patent Application, No. 2006-526209

SUMMARY OF THE INVENTION

Technical Problem

When adding a new function to an application which is configured by the aforementioned general configuration method of an application, it is necessary to inspect and newly define an interface between a program (a part) related to existing functions and a program (a part) related to the new function. The complexity of the configuration of the application increases the time cost and the labor cost, which are consumed to define a new interface necessary to add the new function.

Also, in the method described in PATENT DOCUMENT 1, a boundary of a functional part, which is called a component, needs to be defined by a specific interface in advance, as in a Dependency Injection technique which is a component-oriented application configuration technique. In other words, for a client component and a server component, an interface that can be connected to another component is determined at the design phase of the component.

Therefore, when performing a change of an application which needs connection between components whose boundary is not defined in advance, it is required to reconsider the definition of component boundaries.

An object of the present invention is to connect internal processes of specified components with each other when executing an application (a program) regardless of interface definition between the components (parts) and to execute a new process.

Solution to Problem

The present invention provides a program processing method executed by at least one apparatus. The program processing method includes generating a plurality of connection elements, applying the connection element to each of at least two of a plurality of parts included in an activated program, establishing a communication connection between the connection element applied to one part of the plurality of parts and the connection element applied to another part, and sending a process result of a first process in said one part to said another part through the established communication connection.

Also, the present invention provides a program processing apparatus including an application unit which generates a plurality of connection elements and applies the connection element to each of at least two of a plurality of parts included in an activated program, and a configuration management unit which causes the connection element applied to one part and the connection element applied to another part, which are applied by the application unit, to establish a communication connection with each other and causes said one part to send a process result of a first process in said one part to said another part through the established communication connection.

Further, the present invention provides a computer program stored in a computer-readable storage medium. The computer program causes the computer to execute an application process which generates a plurality of connection elements and applies the connection element to each of at least two of a plurality of parts included in an activated program, and a configuration management process which causes the connection element applied to one part and the connection element applied to another part, which are applied in the application process, to establish a communication connection with each other and causes said one part to send a process result of a first process in said one part to said another part through the established communication connection.

Advantageous Effects of Invention

The present invention can connect internal processes of specified components with each other when executing an application (a program) regardless of interface definition between the components (parts) and can execute a new process.

BRIEF DESCRIPTION OF THE DRAWINGS

The object described above, other objects, the features, and the advantages will become further apparent from the preferred exemplary embodiments described below and the drawings attached thereto.

DESCRIPTION OF EMBODIMENTS

Figure 1:
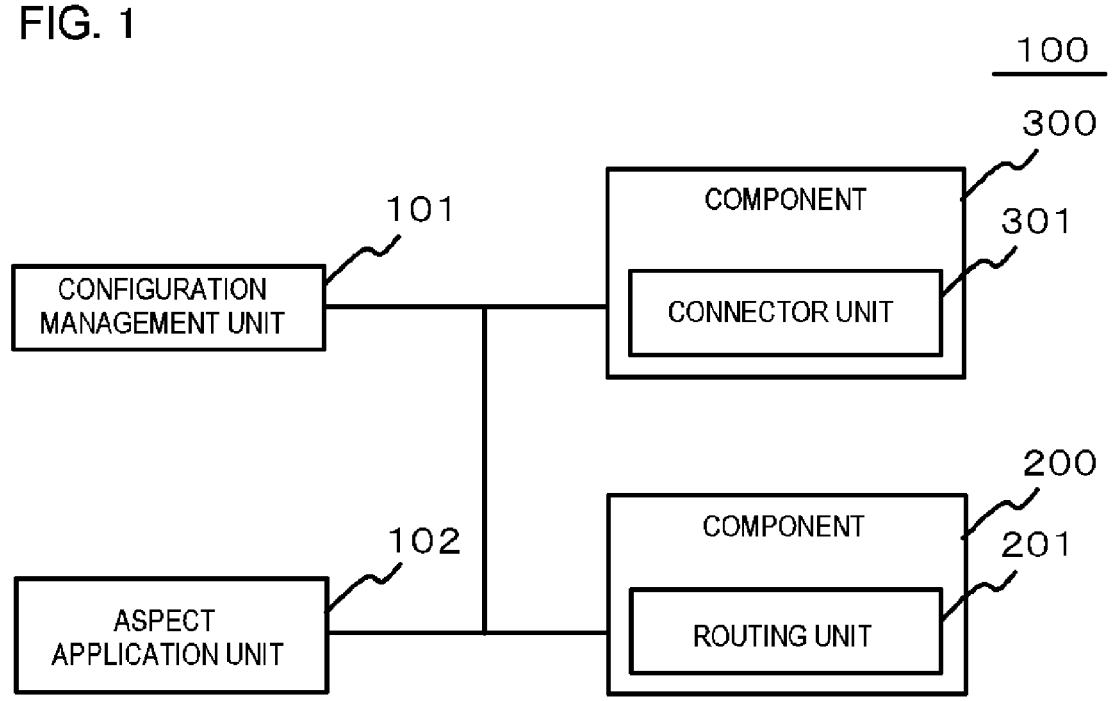
FIG. 1 is a functional block diagram of a program processing apparatus according to a first exemplary embodiment.

Hereinafter, exemplary embodiments of the present invention will be described with reference to the drawings. In all the drawings, the same components are given the same reference numerals and the description will not be repeated.

First Exemplary Embodiment

A first exemplary embodiment for implementing the present invention is an exemplary embodiment of a case in which content of a certain process of a component of an application being used in a program processing apparatus 100 is replaced by another process. For example, it is a case in which an original process that counts the number of characters of an inputted character string is changed to a new process that counts the number of bytes of the character string.

Description of Configuration

FIG. 1 is a functional block diagram of the program processing apparatus 100 according to the first exemplary embodiment. As illustrated in FIG. 1, the program processing apparatus 100 includes a configuration management unit 101, an aspect application unit 102, a component 200, and a component 300.

All the constituent elements included in the program processing apparatus 100 are realized by a computer program. Specifically, a processor (not illustrated in the drawings) included in the program processing apparatus 100 reads and executes a computer program (including an application program) stored in a recording medium (not illustrated in the drawings) such as a non-volatile memory, so that the processor realizes the constituent elements illustrated in FIG. 1.

The component 200 and the component 300 are parts included in the application program activated by the program processing apparatus 100.

In the present exemplary embodiment, the component 200 is a component of the application activated in the program processing apparatus 100 from the initial state, that is, before a part of a process with the component is replaced. The component 300 is a component in which a part of a process of the component 200 is replaced. Here, the part represents a functional unit included in a program. The part is a concept including a module and a class in addition to a component.

The program activated in the present exemplary embodiment is an Aspect Oriented Programming (AOP). The aspect is a definition for performing a process interrupt to a program in a cross-sectional manner, which is used in the AOP. As a framework that realizes the AOP, there are Aspect J in JAVA (registered trademark) and Aspect Sharp in C# language.

A configuration management unit 101 has a function to manage deployment and configuration of each component. More specifically, the configuration management unit 101 has a function to establish a communication connection between a routing unit 201 and a connector unit 301 and send a process result of a specific process in the component 300 to the component 200 through the established communication connection.

The aspect application unit 102 has a function to apply the routing unit 201 or the connector unit 301 to each component by using the aspect. More specifically, the aspect application unit 102 has a function to create the routing unit 201 and the connector unit 301 and apply the routing unit 201 and the connector unit 301 to each of the component 200 and the component 300.

Here, establishing a communication connection means creating a state in which data, programs, and the like can be transmitted and received between a plurality of components. The communication connection may be a local connection in a single apparatus (the program processing apparatus 100) as in the present exemplary embodiment or may be a connection through a communication network. Transmitting through a communication connection means a process for transmitting data, a program, or the like through the communication connection. Although, in the description below, "transmit", "return", "transfer", and the like are used properly according to each process, all the above terms are included in the meaning of "send".

In FIG. 1, the routing unit 201 has already been applied to the component 200 and the connector unit 301 has already been applied to the component 300 by the aspect application unit 102. This process will be described later in detail.

The routing unit 201 has a function to interrupt into a specific process in the component 200 and send a process request to a specific process in the component 300 according to setting.

The connector unit 301 has a function to cause the component 300 to execute a specific process according to the process request sent from the routing unit 201 incorporated in the component 200 and send the process result thereof to the component 200. It does not matter whether the component 200 and the component 300 are executed in the same process or remotely connected to each other using a network.

Description of Operation

Figure 2:
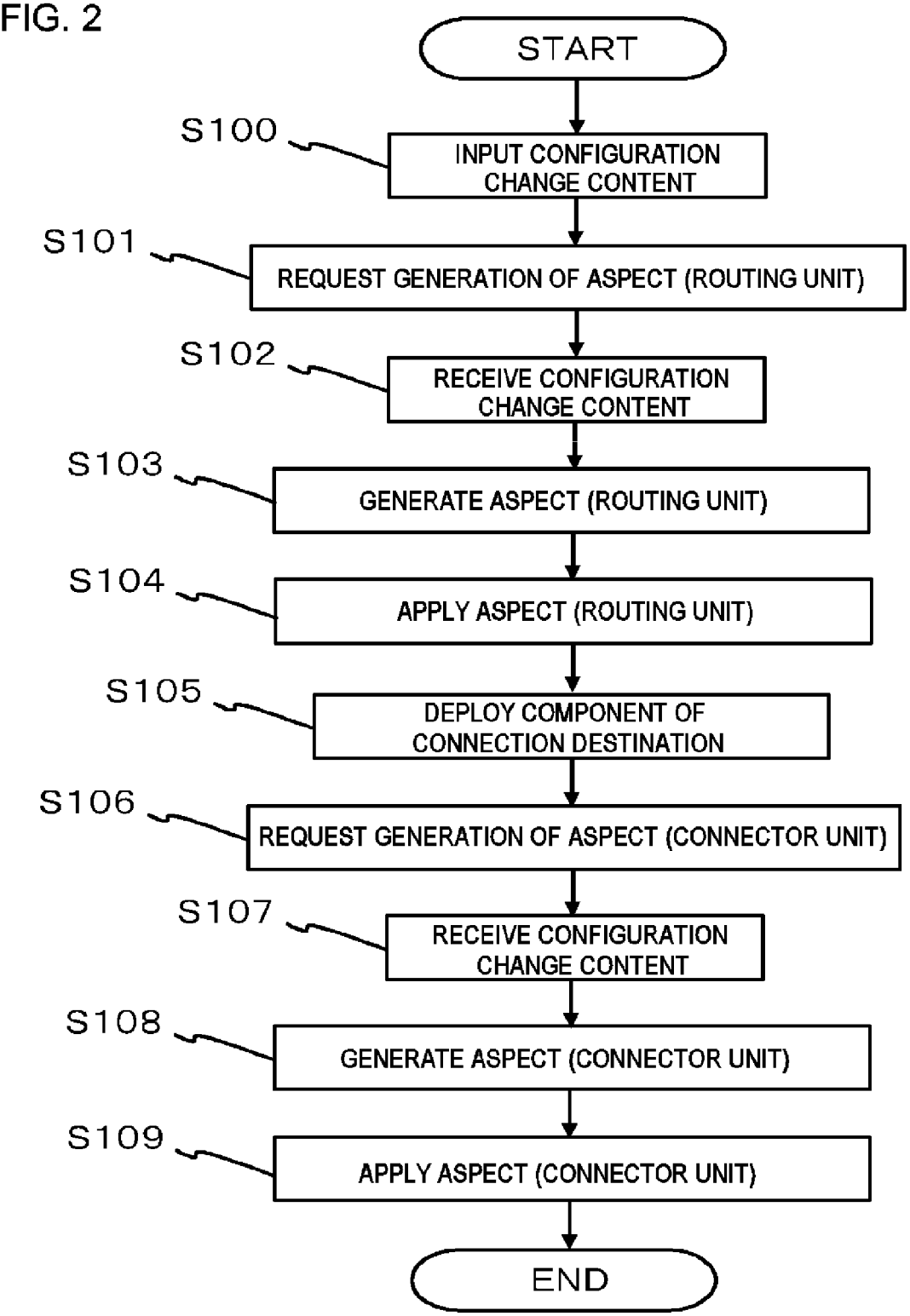
FIG. 2 is a flowchart illustrating an operation for applying a routing unit and a connector unit to each component.

An operation of the program processing apparatus 100 according to the first exemplary embodiment will be described with reference to FIGS. 2, 3, and 4. FIG. 2 is a flowchart illustrating an operation for applying the routing unit 201 and the connector unit 301 to each component.

First, configuration change content of an application is inputted into the configuration management unit 101 (step S100). The configuration change content includes at least the information described below.

- Change information that specifies a process instruction of a component to be changed (the component 200 in the present exemplary embodiment).
- Connection destination information that specifies a connection destination process instruction of a component to be connected after change (the component 300 in the present exemplary embodiment).
- Routing information that specifies a routing part used for connection (the routing unit 201 in the present exemplary embodiment).
- Connector information that specifies a connecting part used for connection (the connector unit 301 in the present exemplary embodiment).

Here, the information that specifies a process instruction varies depending on the implementation language. However, in a general object-oriented language, the information includes a class in which the instruction is executed, a reference to a method signature or a specific variable, and an identifier indicative of change.

Next, the configuration management unit 101 sends the change information and the routing information which are the configuration change content related to the component 200 in the configuration change content obtained in step S100 and requests the aspect application unit 102 to generate an aspect that applies the routing unit 201 to the component 200 (step S101).

Next, the aspect application unit 102 receives the configuration change content related to the component 200 (step S102).

Next, the aspect application unit 102 generates an aspect incorporating the routing unit 201 on the basis of the configuration change content related to the component 200 received in step S102 (step S103).

Next, the aspect application unit 102 applies the aspect generated in step S103 to the component 200, so that the aspect application unit 102 applies the routing unit 201 to the component 200 (step S104).

Next, the configuration management unit 101 deploys the component 300 which has connection destination process instruction and which is connected after the configuration change (step S105).

Next, the configuration management unit 101 sends the connection destination information and the connector information which are the configuration change content related to the component 300 in the configuration change content inputted in step S100 and requests the aspect application unit 102 to generate an aspect that applies the connector unit 301 to the component 300 (step S106).

Next, the aspect application unit 102 receives the configuration change content related to the component 300 (step S107).

Next, the aspect application unit 102 generates an aspect incorporating the connector unit 301 on the basis of the configuration change content related to the component 300 received in step S107 (step S108).

Next, the aspect application unit 102 applies the aspect generated in step S108 to the component 300, so that the aspect application unit 102 applies the connector unit 301 to the component 300 (step S109).

Figure 3:
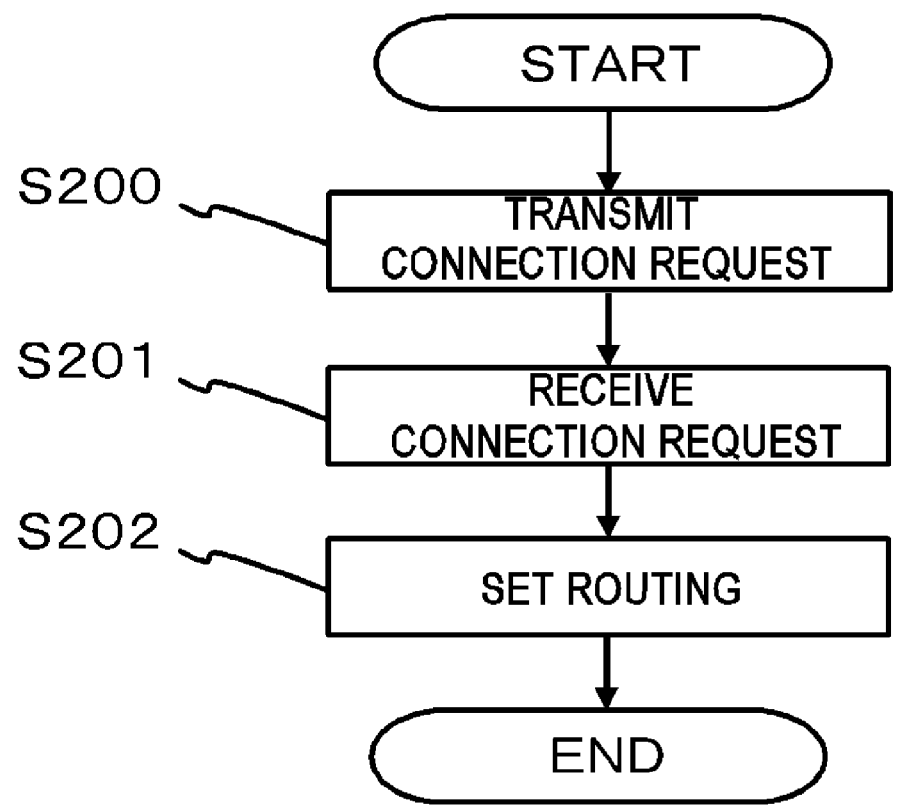
FIG. 3 is a flowchart illustrating an operation for setting the routing unit.

FIG. 3 is a flowchart illustrating an operation for setting the routing unit 201. First, the configuration management unit 101 transmits a connection request to the routing unit 201 so that the routing unit 201 connects to the connector unit 301 (step S200). Here, the transmitted connection request includes the connector information.

Next, the routing unit 201 receives the connection request transmitted in step S200 (step S201).

Next, the routing unit 201 sets routing so that the routing unit 201 connects to the connector unit 301 on the basis of the connection request received in step S201 (step S202).

Here, setting routing means setting process content of the routing unit 201 so that the routing unit 201 locally calls the connector unit 301 when the component 200 and the component 300 are executed in the same process, so that the routing unit 201 calls the component 300 by using a communication function when the component 200 and the component 300 are executed in different processes.

The setting described here can also be realized by performing the setting on a parameter of an execution instance of the routing unit 201 or performing the setting on a file referred to by the routing unit 201 when the routing unit 201 executes a process. Although different from the present exemplary embodiment, when the component 200 and the component 300 are running in environments network-wise separate from each other, the component 200 and the component 300 are running in processes different from each other, so that the routing unit 201 is set in the latter manner.

Figure 4:
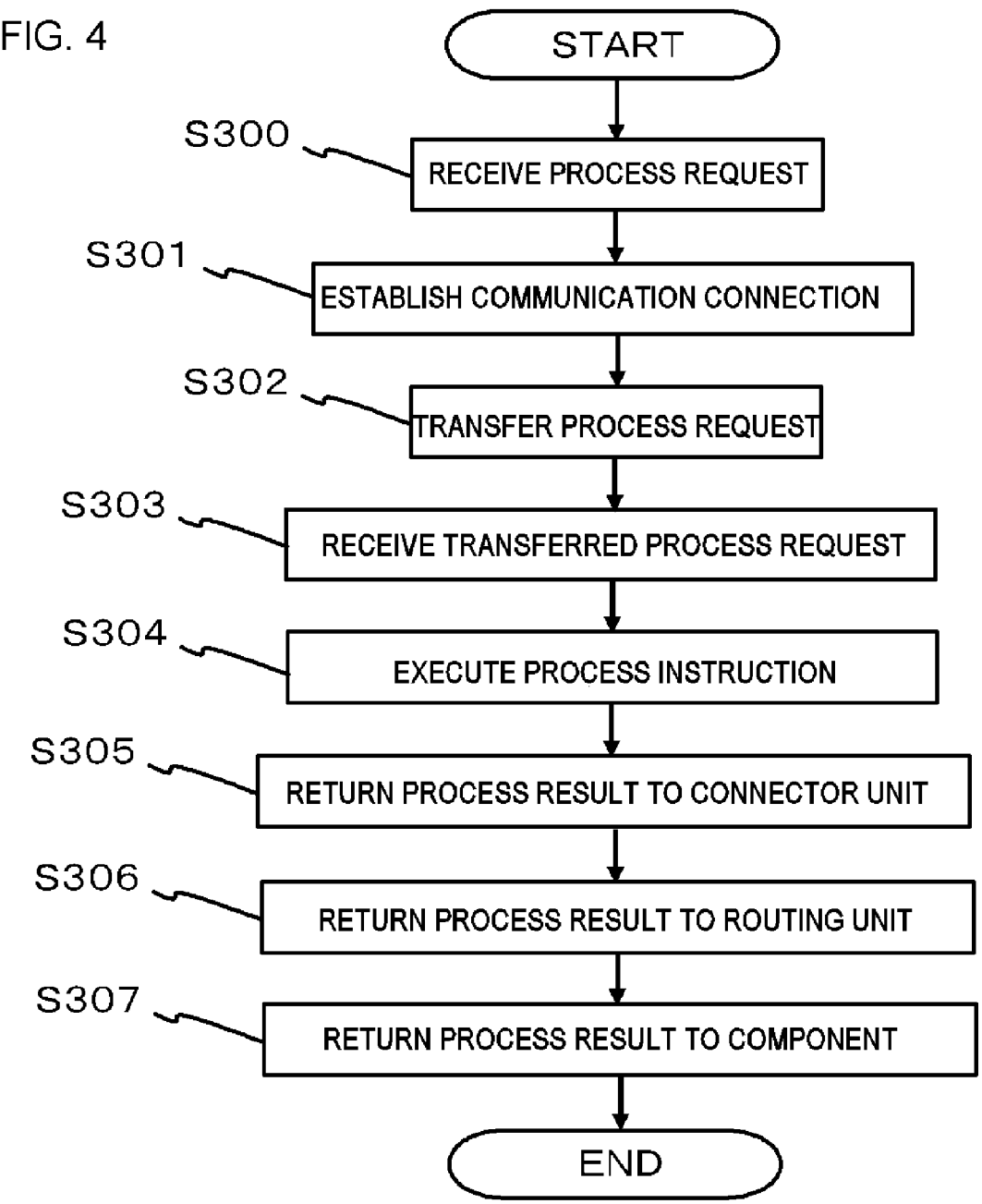
FIG. 4 is a flowchart illustrating an operation when an execution process request is sent to an application.

FIG. 4 is a flowchart illustrating an operation when an application operates, that is, when an execution process request is sent to the application.

First, the routing unit 201 receives a process request through an aspect execution framework according to the aspect applied in step S104 as an extension of the process request to the component 200 (step S300).

Next, the routing unit 201 connects to the connector unit 301 (establishes a communication connection) according to the routing setting set in step S202 (step S301).

Next, the routing unit 201 transfers the process request to the connector unit 301 (step S302).

Next, the connector unit 301 receives the process request transferred in step S302 (step S303).

Next, the connector unit 301 executes the process instruction of the component 300 specified by the connection destination information received in step S106 (step S304).

Next, the component 300 returns a process result of the process instruction executed in step S304 to the connector unit 301 (step S305). Here, the process result is a return value of a function in a general process language.

Next, the connector unit 301 returns the process result received in step S305 to the routing unit 201 (step S306).

Next, the routing unit 201 returns the process result received in step S306 to the component 200 (step S307). At this time, the routing unit 201 does not execute the process instruction which would have been executed in the component 200 and returns the process result to the process which requests the process instruction.

Description of Effect

In the first exemplary embodiment, the routing unit 201 and the connector unit 301, which connect between the components by using the AOP, are incorporated in each component. Thereby, it is possible to replace a function of a specific internal interface without depending on an external interface determined at the design stage of the components. Therefore, it is possible to perform a small specification change of the application and a temporary correction of a bug in a short period of time, so that the system can be maintained in a sound condition at all times.

Also, while the application program is running, it is possible to change the configuration of the application program according to the environment at that time.

Further, the application program can be changed easily while the application program is operating, so that the labor cost and the time cost of developing the application are reduced.

Second Exemplary Embodiment

A second exemplary embodiment for implementing the present invention is an exemplary embodiment of a case in which a new process is added to a certain process in a component of an application program being executed in a program processing apparatus 100, so that a function that is not included in the application program is added to the application program. For example, the second exemplary embodiment is applied to add a function to control priority of execution according to specific information included in a process request when a specific process is executed, that is, to add a so-called queue.

Description of Configuration

The configuration of the program processing apparatus 100 of the present exemplary embodiment is the same as that of the first exemplary embodiment, that is, the configuration illustrated in FIG. 1.

Description of Operation

The operation of the program processing apparatus 100 of the present exemplary embodiment is different from that of the first exemplary embodiment in the procedure described below.

The difference is that, after step S307 in FIG. 4, the process instruction in the component 200, which would have been executed in the component 200, is executed by using the process result returned from the component 300 (connector unit 301). At this time, the process result returned from the component 300 is used as an input of the process instruction. However, here, the process result is different from that of the first exemplary embodiment. The process result is not a return value, but information obtained after the component 300 has edited information included in the process request to the process instruction received in step S300.

Description of Effect

According to the second exemplary embodiment, another component is connected to a component, so that it is possible to add a new function which was not included in the component to the component. Thereby, for example, it is possible to incorporate an access control mechanism into a specific process instruction, a function of priority control, a check function of information included in a process request, and the like. Further, there is an effect that these functions can be applied without changing the implementation of the application components.

Third Exemplary Embodiment

A third exemplary embodiment for implementing the present invention is an exemplary embodiment applied in a case in which copies of a component of an application being executed are deployed in a plurality of servers and the copied components and the original component are connected to each other, so that scale out of the application is realized.

Description of Configuration

Figure 5:
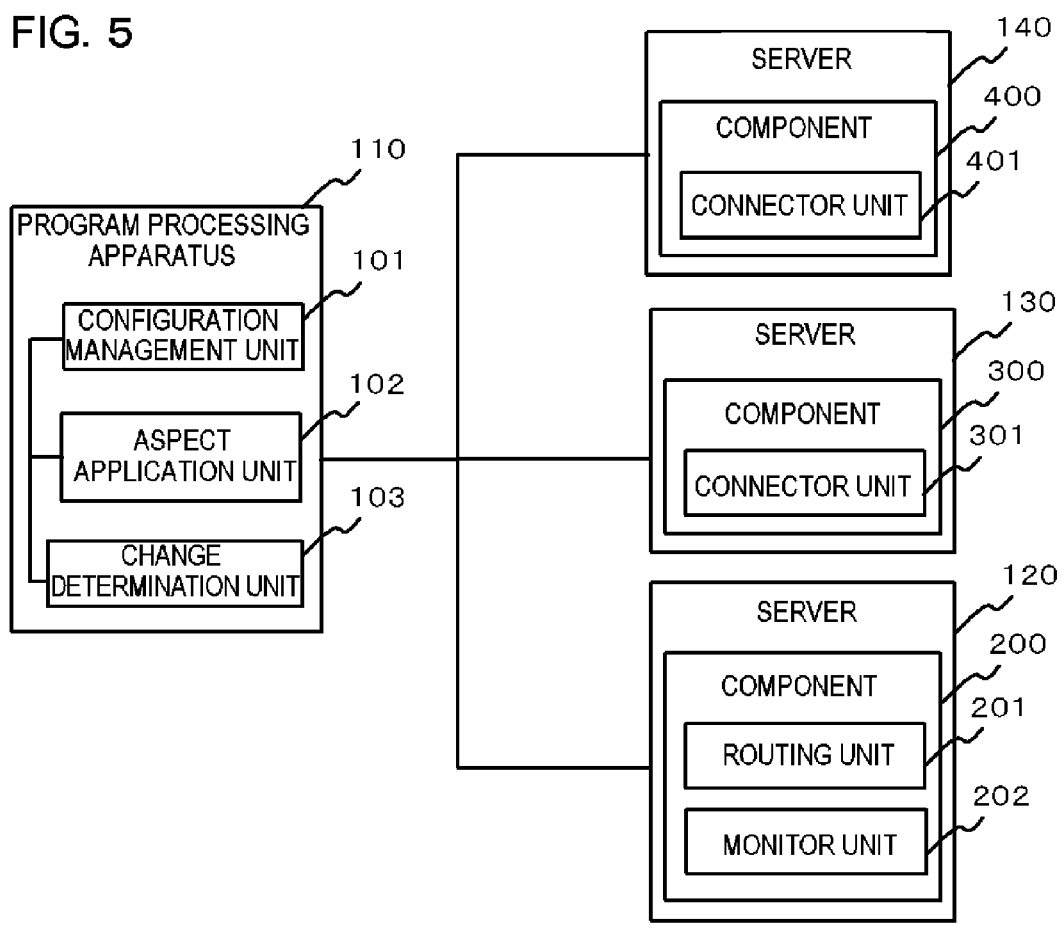
FIG. 5 is a functional block diagram illustrating a program processing apparatus and servers according to a third exemplary embodiment.

FIG. 5 is a functional block diagram illustrating a program processing apparatus 110 and servers 120, 130, and 140 according to the third exemplary embodiment.

In the component 200 of the present exemplary embodiment, a monitor unit 202 is further applied in addition to a routing unit 201. The operation related to the application of the monitor unit 202 will be described in detail with reference to FIG. 6.

The monitor unit 202 measures a parameter related to the component 200 to which the monitor unit 202 is applied. Although, in FIG. 5, the monitor unit 202 is applied to only the component 200, if the same monitor unit is applied to a plurality of components, it is also possible to measure a state of the entire application including these components. The parameter measured by the monitor unit 202 is transmitted to a change determination unit 103. The process for transmitting the parameter from the monitor unit 202 to the change determination unit 103 may be a sequential process or may be a batch process.

The program processing apparatus 110 of the present exemplary embodiment is different from the program processing apparatus 100 of the first exemplary embodiment in a point that the change determination unit 103 is added and the component 200 and the component 300 are not present in the program processing apparatus 110. The configuration of the third exemplary embodiment is different from that of the first exemplary embodiment in a point that the configuration described below is added to the configuration of the first exemplary embodiment.

The change determination unit 103 has a function to determine whether or not the configuration of the application should be changed from the state of the system and request a change of the application according to the determination. More specifically, the change determination unit 103 sends a change request of the component 200 to which the monitor unit 202 is applied according to a value of the parameter measured by the monitor unit 202. Then, the aspect application unit 102 applies the routing unit or the connector unit to the component 200 specified by the change request and another component (the component 300 or the component 400 in the present exemplary embodiment) according to the sent change request.

In FIG. 5, the components 200, 300, and 400 are deployed in the servers 120, 130, and 140 respectively in advance. The operation related to the deployment will be described in detail with reference to FIG. 7.

Description of Operation

The operation in the third exemplary embodiment will be described with reference to FIGS. 3, 4, 6 and 7.

Figure 6:
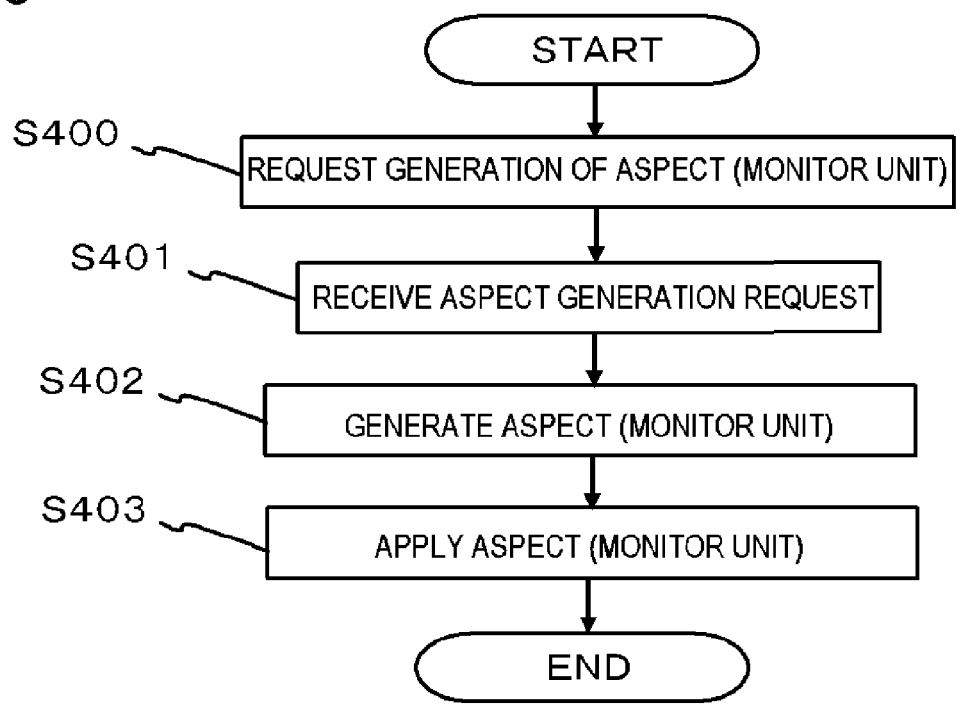
FIG. 6 is a flowchart illustrating an operation for incorporating a monitoring function in an application.

FIG. 6 is a flowchart illustrating an operation for incorporating a monitoring function in an application.

First, the change determination unit 103 requests the aspect application unit 102 to generate an aspect for applying the monitor unit 202 to the component 200 (step S400). Here, regarding instructions in the component 200, to which the monitor unit 202 is applied, all the internal instructions in the component 200 are specified. However, if there are instructions that are obviously meaningless in the programming language or the application architecture, these instructions may be excluded from the instructions to which the monitor unit 202 is applied.

Next, the aspect application unit 102 receives an aspect generation request that is requested in step S400 (step S401).

Next, the aspect application unit 102 generates an aspect for incorporating the monitor unit 202 in the specified instructions (step S402).

Next, the aspect application unit 102 applies the generated aspect to the component 200 (step S403).

Figure 7:
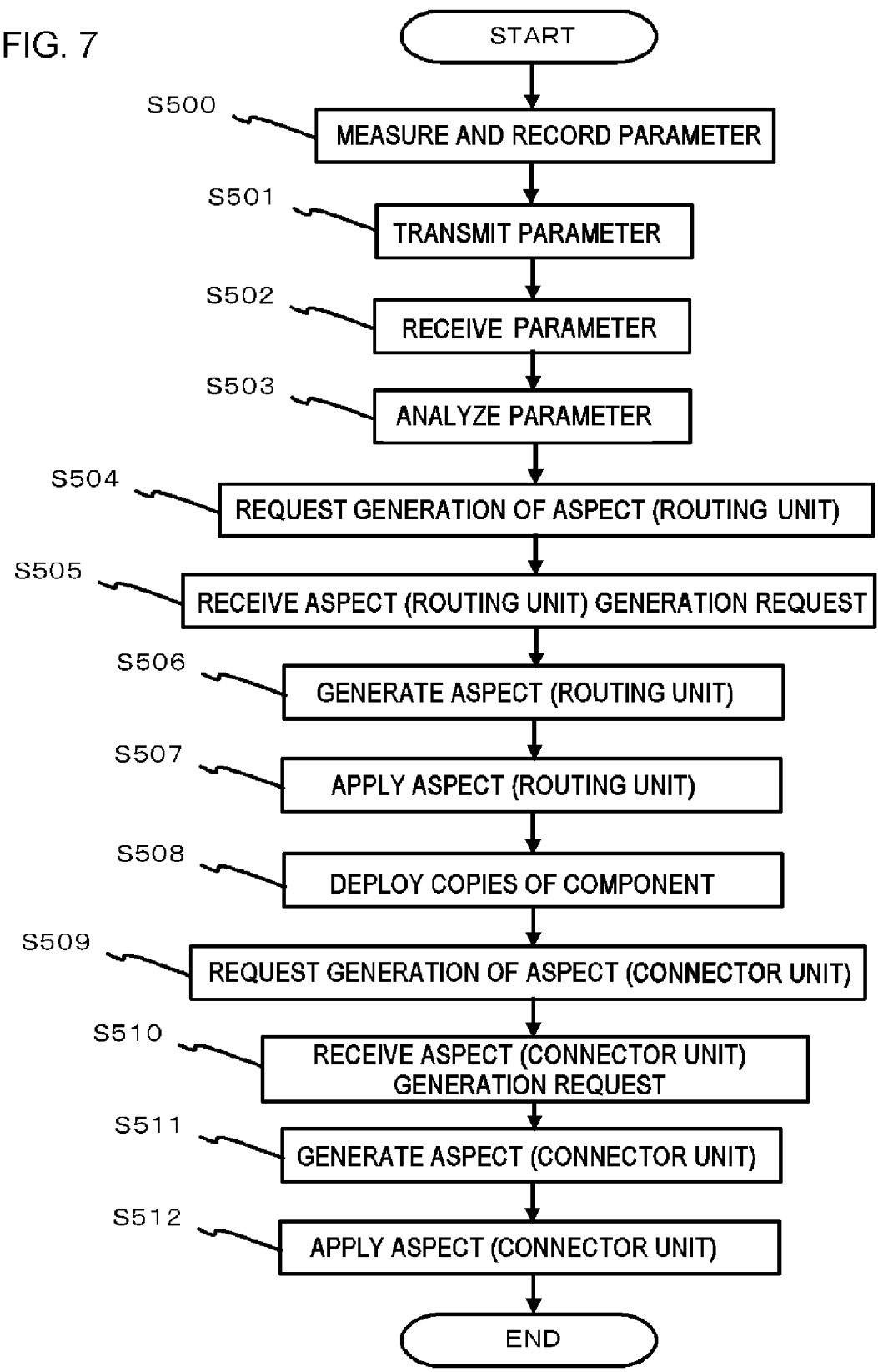
FIG. 7 is a flowchart illustrating an operation for deploying a copy of a component to a plurality of servers.

FIG. 7 is a flowchart illustrating an operation for deploying copies of the component 200 to a plurality of servers.

First, the monitor unit 202 monitors a state of the system and measures and records a parameter such as load information (step S500).

Next, the monitor unit 202 transmits the recorded parameter to the change determination unit 103 (step S501). Here, the load information is information that indicates the processing load of the component 200 to which the monitor unit 202 is applied. Examples of the load information include an amount of process requests received in a certain time period and a period of time required to execute a process.

Next, the change determination unit 103 receives the parameter transmitted in step S501 (step S502).

Next, the change determination unit 103 analyzes a value of the parameter transmitted from the monitor unit 202 and determines which process instruction in the component 200 should be changed (step S503). In the present exemplary embodiment, a process instruction, in which the processing load indicated by the load information included in the parameter is higher (larger) than a predetermined value, is determined to be a process instruction to be changed.

Next, the change determination unit 103 requests the aspect application unit 102 to generate an aspect for applying the routing unit 201 to the component 200 which has a process instruction to be changed (step S504).

The operations of the subsequent step S505, step S506, and step S507 are the same as those of step S102, step S103, and step S104, respectively, the description thereof will not be repeated.

Next, the configuration management unit 101 deploys the component 300 and the component 400 which are copies of the component 200 in a plurality of servers 130 and 140 (step S508). The operation of step S508 is the same as that of step S105 of the first exemplary embodiment except that the components to be deployed are the copies of the component 200 and the deployment destinations are the plurality of servers 130 and 140.

Next, the change determination unit 103 requests the aspect application unit 102 to generate an aspect for applying the connector unit 301 or the connector unit 401 (step S509). The operations of the subsequent step S510 and step S511 are the same as those of step S107 and step S108 in the first exemplary embodiment, respectively.

Next, the aspect application unit 102 applies the aspect generated in step S511 to the component 300 and the component 400 (step S512). This operation is the same as that of step S109 in the first exemplary embodiment except that the application destinations are the component 300 and the component 400.

Subsequently, the routing unit 201 is set. This operation is the same as that described with reference to FIG. 3 except for the points described below.

First, it is different that the content of the setting transmitted to the routing unit 201 in step S200 is set so that the routing unit 201 is connected to the connector unit 301 or the connector unit 401. This is a setting for distributing and transferring the process request received by the routing unit 201 to the connector unit 301 or the connector unit 401. Therefore, it is different that the routing setting that is set in the routing unit 201 in step S202 is a setting to connect to the connector unit 301 or the connector unit 401.

The subsequent procedure is the same as the operation described with reference to FIG. 4, that is, the operation when the execution process request is sent to the application, except for the points described below.

It is different that the routing unit 201 can be connected to both of the connector unit 301 and the connector unit 401, because the connection destination of the routing unit 201 is set to the connector unit 301 or the connector unit 401 in step S301. Therefore, a point in which, in the description of the subsequent steps S302 to S306, the component 300 and the connector unit 301 may be replaced by the component 400 and the connector unit 401, respectively is different from the operation of the first exemplary embodiment.

Regarding the determination whether to connect to the connector unit 301 or the connector unit 401, cases as described below are considered. The simplest method is a round robin method in which the connection destination is changed in turn each time the process request is received.

Although not illustrated in FIG. 5, if the same elements as those of the monitor unit 202 are applied to the component 300 and the component 400, the determination as described below is considered. The configuration management unit 101 may obtain parameters (load information) related to the component 300 and the component 400 and select which one of the connector unit 301 and the connector unit 401 the configuration management unit 101 connects to. For example, it is possible to establish connection between a connector unit which is applied to a component in which the processing load is low and routing unit 201.

Description of Effect

In the third exemplary embodiment, a plurality of connection destinations of the component 200 are prepared and the same components as the component 200 are set to connection destinations, so that there is an effect that a process is distributed when the load of the application is high. Thereby, it is possible to provide a mechanism for avoiding a performance problem of a specific process in a component in a short period of time, which is not anticipated when the application is designed.

Further, the configuration of the application can be changed according to a change of the state of the system by monitoring the state of the system in real time, thereby enabling to maintain the system in an optimal state at all times.

Fourth Exemplary Embodiment

A fourth exemplary embodiment for implementing the present invention is an exemplary embodiment of a case in which the components distributed and deployed in the third exemplary embodiment are deployed to servers separated on a network and a setting of a network device such as a router is required. The case is, for example, a case in which VLAN or the like is used and a setting change is performed on router hardware.

Description of Configuration

Figure 8:
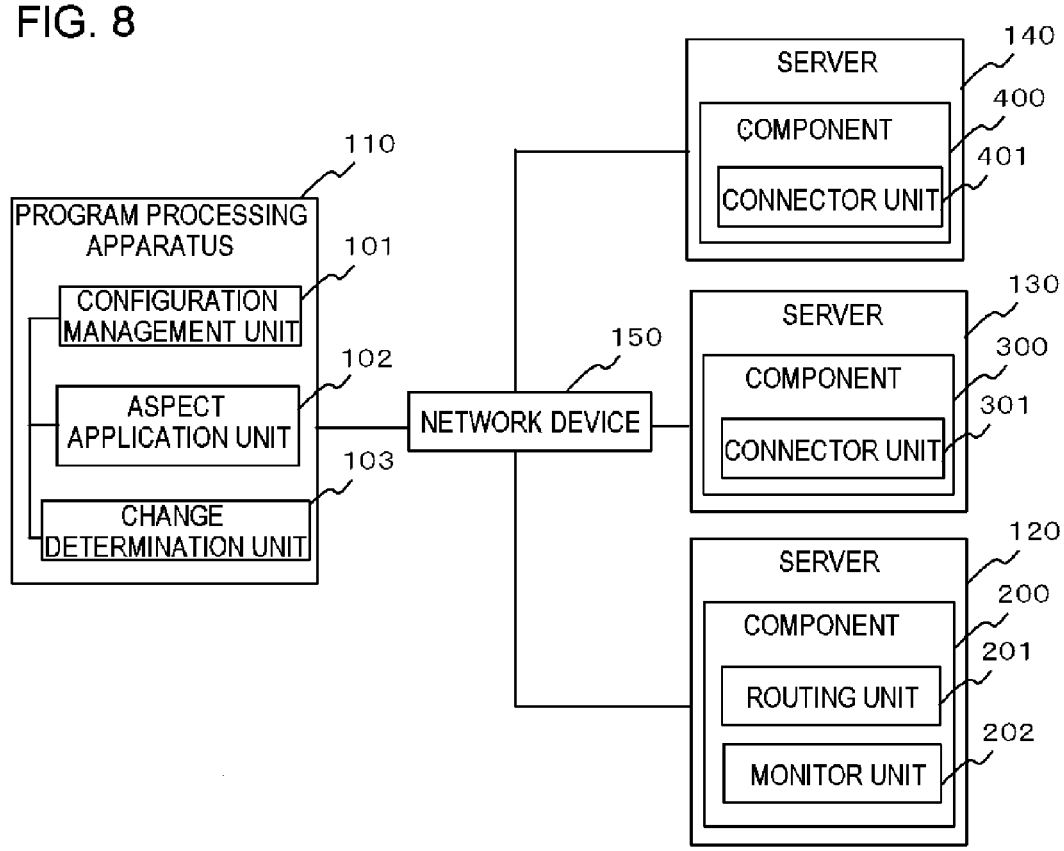
FIG. 8 is a functional block diagram of a program processing apparatus and servers according to a fourth exemplary embodiment.

FIG. 8 is a functional block diagram of a program processing apparatus 110 and servers 120, 130, and 140 according to the fourth exemplary embodiment.

The configuration of FIG. 8 is different from that of FIG. 5 in a point that the program processing apparatus 110 and servers 120, 130, and 140 are connected to each other through a network device 150. Specifically, the routing unit 201 is applied to the component 200 that configures a program run on the server 120. Also, the connector unit 301 (or 401) is applied to the component 300 (or 400) that configures a program run on the server 130 (or 140) connected to the server 120 through the network device 150. Here, the network device 150 is, for example, a router.

Description of Operation

The operation of the present invention is different from the operation procedure of the third exemplary embodiment in a point that, before establishing a communication connection between the routing unit 201 and the connector unit 301 (or 401), a setting for enabling the communication connection is requested to the network device 150.

More specifically, before step S508 in FIG. 7, a network setting is requested to the network device 150 so that the server 120 on which the component 200 operates can be connected to the server 130 (or 140) on which the component 300 (or the component 400) operates.

The network device 150, which receives the setting request, applies received setting content and enables the connection from the server 120 on which the component 200 operates to the server 130 (or 140) on which the component 300 (or the component 400) operates.

Description of Effect

According to the fourth exemplary embodiment, the setting of the network device is performed according to the deployment of the copied components, thereby, for example, enabling to distribute the process to remote systems. This enables an automatic construction of a distributed processing system which uses a cloud environment continuously developing in recent years.

Although the exemplary embodiments of the present invention have been described with reference to the drawings, these exemplary embodiments are examples and various configurations other than those described above can be employed.

In the above exemplary embodiments, the connection elements of the present invention are described as the routing unit and the connector unit. Although, in the description of each exemplary embodiment, the routing unit and the connector unit are described to have functions different from each other, it is not limited to this. That is to say, a connection element having both functions is applied and the connection element may be caused to function as the routing unit or the connector unit depending on the situation.

In the exemplary embodiments described above, it is exemplified that each unit of the program processing apparatus is logically realized as various functions by a computer program. However, each of the units can be formed as a unique hardware unit or can be realized as a combination of software and hardware.

In the descriptions of the exemplary embodiments described above, plural flowcharts are used and plural steps are sequentially described in each flowchart. However, the order of the descriptions does not limit the order of executing the steps of the program processing method of the present invention. Therefore, when the program processing method of the present invention is executed, the order of the plural steps can be changed within a range in which the process is not disturbed.

Of course, the exemplary embodiments described above can be combined within a range in which the contents of the exemplary embodiments do not conflict with each other. Although, in the exemplary embodiments described above, the functions and the like of the constituent elements are specifically described, the functions and the like can be variously modified within a range in which the present invention is satisfied.

The present invention can be used to maintain the application and secure the scalability of the application and can be used as an automatic configuration infrastructure of an application in a large-scale system.

This application claims a priority based on Japanese Patent Application No. 2010-079226 filed Mar. 30, 2010, which is hereby incorporated by reference herein in its entirety.

The invention claimed is:

1. A program processing apparatus comprising:
    an application unit, executed by a processor, which generates a plurality of connection elements and applies at least one of the plurality of connection elements to each of at least two of a plurality of components comprised in an activated program; and
    a configuration management unit which causes a first connection element and a second connection element, which are respectively applied by the application unit to one component of the plurality of components and another component of the plurality of components, to establish a communication connection with each other and causes said one component to send data made as a process result of a first process in said one component to said another component through the established communication connection, wherein said configuration management unit causes:
        the second connection element to interrupt a designated part of process instructions in said another component and to send a process request to the first connection element, and
        the first connection element to have said one component execute the first process in response to the sent process request and to send data, made as a process result of the first process, to said another component through the communication connection,
    wherein the second connection element is configured to set the data, received from the first connection element, as an input of the designated part of process instructions in said another component, and to obtain the data received from the first connection element by subjecting data, contained in the process request sent to the first connection element by the second connection element, to the first process, and
    the second connection element is further configured to return the data received from the first connection element to a process which requests the designated part of process instructions in said another component without executing the designated part of process instructions.

2. A computer program stored in a non-transitory computer-readable storage medium, the computer program causing the computer to execute:
    an application process which generates a plurality of connection elements and applies at least one of the plurality of connection elements to each of at least two of a plurality of components comprised in an activated program; and
    a configuration management process which causes a first connection element and a second connection element, which are respectively applied in the application process to one component of the plurality of components and another component of the plurality of components, to establish a communication connection with each other and causes said one component to send data made as a process result of a first process in said one component to said another component through the established communication connection, wherein said configuration management process causes:

the second connection element to interrupt a designated part of process instructions in said another component and to send a process request to the first connection element, and the first connection element to have said one component execute the first process in response to the send process request and to send data, made as a process result of the first process, to said another component through the communication connection, wherein the second connection element setting the data, received from the first connection element, as an input of the designated part of process instructions in said another component, the data received from the first connection element is obtained by subjecting data, contained in the process request sent to the first connection element by the second connection element, to the first process, and the second connection element returning the data received from the first connection element to a process which requests the designated of process instructions in said another component without executing the designated part of process instructions.

3. A program processing method executed by at least one apparatus, the program processing method comprising:

generating a plurality of connection elements and applying at least one of the plurality of connection elements to each of at least two of a plurality of components comprised in an activated program;

establishing a communication connection between a first connection element and a second connection element, the first connection element as applied to one component of the plurality of components and the second connection element as applied to another component of the plurality of components;

sending data made as a process result of a first process in said one component to said another component through the established communication connection, wherein said sending data made as the process result of the first process comprises:

the second connection element interrupting a designated part of process instructions in said another component and sending a process request to the first connection element, and the first connection element causing said one component to execute the first process according to the sent process request and sending data, made as a process result of the first process, to said another component through the communication connection, and wherein the program processing method further comprises:

the second connection element setting the data, received from the first connection element, as an input of the designated part of process instructions in said another component, the data received from the first connection element is obtained by subjecting data, contained in the process request sent to the first connection element by the second connection element, to the first process; and the second connection element returning the data received from the first connection element to a process which requests the designated part of process instructions in said another component without executing the designated part of process instructions.

4. The program processing method according to claim 3, further comprising:

applying a monitor element that measures a parameter related to at least one component of the plurality of components comprised in the activated program to said at least one component; and sending a change request of said at least one component, to which the monitor element is applied and to which a connection element has not yet been applied, according to a value of the parameter measured by the applied monitor element, wherein said applying the connection element further comprises applying the connection element to the plurality of components including said at least one component specified by the change request, according to the sent change request.

5. The program processing method according to claim 4, wherein said applying the connection element further comprises applying the connection element to at least three components including said at least one component specified by the change request, and said establishing the communication connection further comprises selecting another connection element, that establishes a communication connection with the connection element applied to the component specified by the change request, according to a value of the parameter measured by the monitor element.

6. The program processing method according to claim 4, wherein the parameter measured by the monitor element is load information related to a process in the component to which the monitor element is applied.

7. The program processing method according to claim 3, wherein said applying the connection element further comprises applying the connection element to a first component, configuring a first program activated in one apparatus, and a second component, configuring a second program activated in another apparatus connected to the one apparatus through a network device, and said applying the connection element further comprising requiring a setting, which enables a communication connection between the connection element applied to the first component and the connection element applied to the second component, to the network device before establishing the communication connection.

8. The program processing method according to claim 3, wherein the program is an Aspect Oriented Programming, and said applying the connection element further comprising applying the connection element to the component by using an aspect incorporating the connection element.

* * * * *